United States Patent
Abesadze et al.

[11] Patent Number: 6,146,601
[45] Date of Patent: Nov. 14, 2000

[54] ENRICHMENT OF SILICON OR GERMANIUM ISOTOPES

[75] Inventors: Teimuraz Abesadze, Joplin, Mo.; William E. Saunders, Miami, Okla.; Marvin Y. Wachs, Joplin, Mo.; Dennis K. Manning, Commerce, Okla.

[73] Assignee: Eagle-Picher Industries, Inc., Cincinnati, Ohio

[21] Appl. No.: 09/428,373

[22] Filed: Oct. 28, 1999

[51] Int. Cl.[7] .............................. C01G 17/04; C01B 33/08
[52] U.S. Cl. .................. 423/89; 423/2; 423/341; 423/489; 423/491; 423/91; 423/DIG. 7; 210/681
[58] Field of Search ................. 423/2, 348, 341, 423/489, DIG. 7, 659, 491, 89, 91; 203/5; 210/681

[56] References Cited

U.S. PATENT DOCUMENTS

| | | | |
|---|---|---|---|
| 3,843,570 | 10/1974 | Murayama | 260/2.5 M |
| 4,124,801 | 11/1978 | Cook et al. | 250/288 |
| 4,824,537 | 4/1989 | Arai et al. | 204/157.22 |
| 4,885,149 | 12/1989 | De Freitas et al. | 423/339 |
| 5,144,409 | 9/1992 | Ma | 257/557 |
| 5,346,678 | 9/1994 | Phillips et al. | 423/2 |
| 5,442,191 | 8/1995 | Ma | 257/1 |
| 5,711,925 | 1/1998 | Noda et al. | 423/341 |
| 5,917,195 | 6/1999 | Brown | 257/22 |

FOREIGN PATENT DOCUMENTS 2120345  8/1972  France ........................ 423/2

OTHER PUBLICATIONS

Lyman et al, "Enrichment of Boron, Carbon & Silicon Isotopes . . . Laser Radiation", J. of Applied Physics, vol. 47, No. 2, pp. 595–601, Feb. 1976.

Thomas R. Mills, *Silicon Isotope Separation by Distillation of Silicon Tetrafluoride*, Marcel Dekker, Inc. 1990 (No Month).

*Primary Examiner*—Ngoc-Yen Nguyen
*Attorney, Agent, or Firm*—Wood, Herron & Evans, LLP

[57] ABSTRACT

Isotopes of either germanium or silicon are separated by a chemical exchange reaction. Preferably the compound is a hydro halide or halide composition and the donor can be a wide variety of compounds such as a lower molecular weight alcohol.

10 Claims, 1 Drawing Sheet

ENRICHMENT OF SILICON OR GERMANIUM ISOTOPES

Silicon and germanium are both used extensively in semiconductor applications. Both of these elements are made up of multiple isotopes. Silicon, for example, includes $^{28}Si$, $^{29}Si$ and $^{30}Si$. By far the most abundant isotope is the $^{28}Si$ making up over 92% of natural silicon.

Germanium has five different isotopes, $^{70}Ge$, $^{72}Ge$, $^{73}Ge$, $^{74}Ge$ and $^{76}Ge$. Although $^{74}Ge$ is predominant forming about 36% of natural germanium. $^{70}Ge$ and $^{72}Ge$ form 20% and 27% of natural germanium, respectively.

In certain applications, it is desirable to utilize isotopically enriched germanium or silicon. For example, Arai et al., U.S. Pat. No. 4,824,537 indicates that enriched silicon isotopes can be used in electronic devices. Ma U.S. Pat. Nos. 5,442,191 and 5,144,409 both disclose the use of isotopically enriched semiconductor materials.

To date very little work has been done with such isotopically enriched silicon and germanium. The primary reason for this is the inability to efficiently separate the isotopes. The Arai '537 patent discloses one technique utilizing a carbon dioxide laser. The yields of laser separation are very low and the process itself is not actually commercially viable.

Distillation has also been used to separate silicon isotopes. (See Mills, Thomas R., Silicon Isotope Separation by Distillation of Silicontetrafluoride. Separation Screen and Technology, 25(3), pp. 335–345, 1990). However, because of the very low separation constant this process is simply not commercially viable.

Chemical exchange reactions have been used to separate isotopes of elements with lower atomic weights such as carbon, nitrogen, oxygen and boron. However, silicon and germanium have such high atomic weights that they were not considered suitable for chemical exchange reactions.

SUMMARY OF THE INVENTION

The present invention is premised upon the realization that silicon as well as germanium isotopes can be separated by chemical exchange reactions. In particular, silicon or germanium halides or hydro halides undergo chemical exchange reactions with complexes formed by these compounds and Lewis base ligands. This separation mechanism can be used to efficiently separate $^{28}Si$ from $^{29}Si$ and $^{30}Si$ or $^{29}Si$ from $^{30}Si$. Likewise these chemical reactions will permit separation of $^{70}Ge$ from the $^{72}Ge$, $^{73}Ge$, $^{74}Ge$ and $^{76}Ge$ and subsequent separation of the remaining germanium isotopes from each other. In particular, low molecular weight alcohols including methanol, ethanol and isopropanol are effective ligands as well as carbon.

By utilizing chemical exchange reactions according to the present invention, the cost of isolating silicon or germanium isotopes can be reduced by a factor of between 10 and 100.

The present invention will be further appreciated in light of the following detailed descriptions and drawings in which:

BRIEF DESCRIPTION OF DRAWING

The FIGURE is a diagramatic view of an isotopic separation chemical exchange process for use in the present invention.

DETAILED DESCRIPTION

Figure 1:
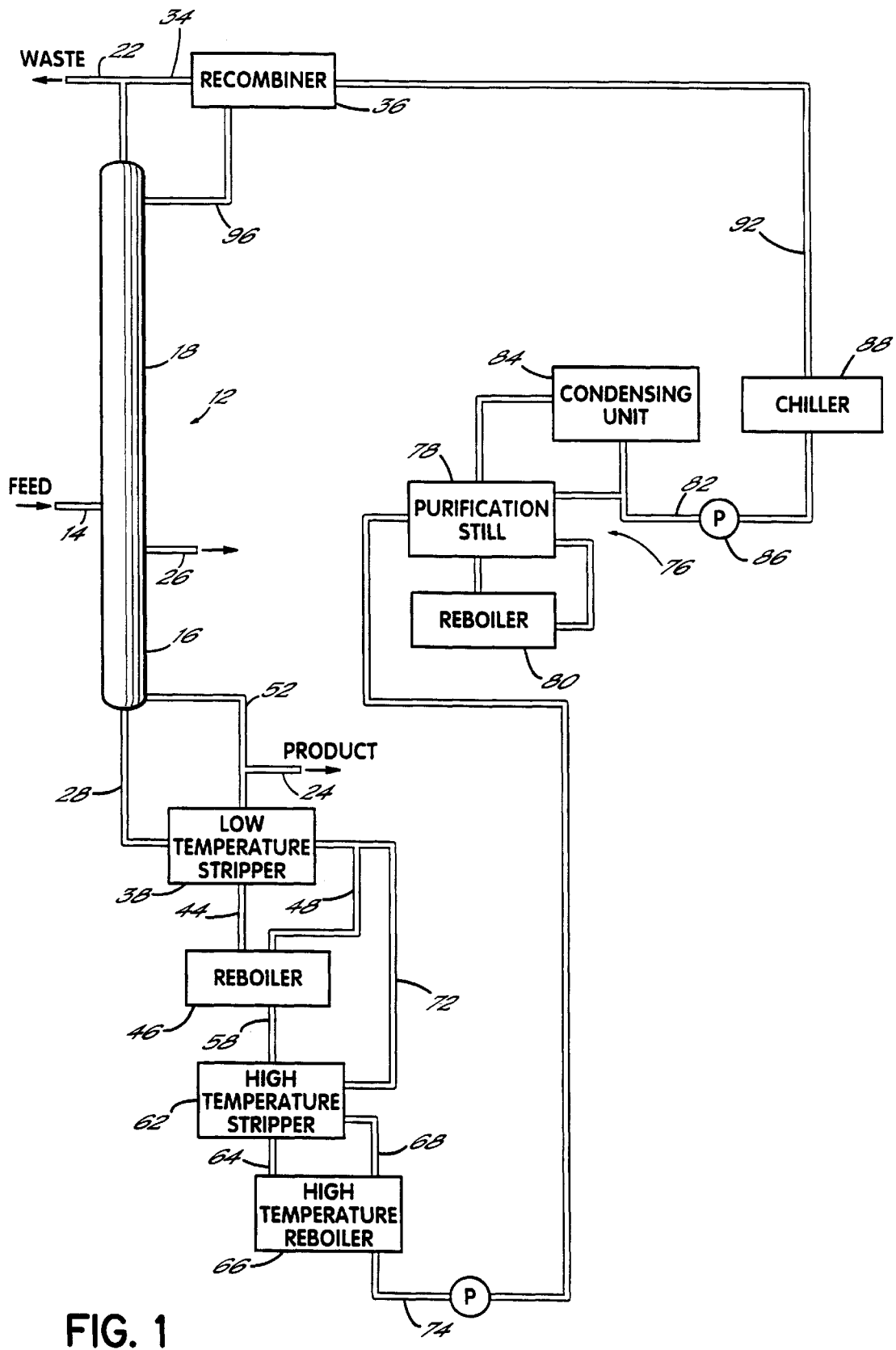

For use in the present invention, the germanium and silicon compounds useful in the present invention should have one of the following general formulas: $GeH_nX_{4-n}$ or $SiH_nX_{4-n}$ wherein X represents a halide and n equals an integer from 0 to 4. In the present invention, the preferred halide is fluorine and preferably $_n$ is 0 or 1 for either a germanium or silicon compound.

The isotopic separation reaction for silicon and germanium utilized in the present invention may be written in the following general form:

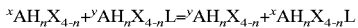
$$^xAH_nX_{4-n}+^yAH_nX_{4-n}L = ^yAH_nX_{4-n}+^xAH_nX_{4-n}L$$

In this reaction $^x$ and $^y$ represent isotopic species of silicon or germanium, A represents those elements and L is a complexing agent.

Si or Ge compounds will be reacted with a complex during the isotope separation process to form an isotopically enriched complex which is recovered. Ligands which form complexes with those compounds, can vary widely. Generally the ligands are volatile organic solvents, particularly lower alkyl alcohols, such as methanol, ethanol, and propanol. Polyethylene glycol, crown ethers and alkyl amines also can be used as a solvents in this chemical exchange process. It is preferable that the complexing agent be liquid at separation temperature, but this is not critical. It may be in the gas phase. Further the present invention can utilize solid ligands such as activated carbon, silica gel or molecular sieves.

Since Si and Ge have 3 and 5 isotopes respectively, the chemical exchange process will utilize 3 and 10 such reactions.

The general process and apparatus for enriching either silicon or germanium isotopes is depicted in FIG. 1. This will be discussed with respect to silicon and specifically silicon tetrafluoride. However, the same process can be used with other silicon precursors as well as germanium precursors.

Preparation of the complex may take place either inside or outside the column. Correspondingly circulation of the complexing agent may be arranged externally or internally of the column.

Selection of the complex circulation scheme greatly depends on the thermal properties of the complex and ligand itself. The following description utilizes external ligand circulation and complex formation inside the column. Again this describes the separation of silicon isotopes using a compound such as silicon tetrafluoride. The same scheme works in the separation of germanium isotopes using, for example, germanium tetrafluoride.

As shown in the figure, the column 12 used for the separation of the present invention generally includes a complex inlet 14 which leads into the stripping section 16 of the column 12. The heavier isotope is then collected through outlet 22 wherein the lighter isotope is collected through outlet 24. A further midsection outlet 26 is provided to collect the intermediate weight isotope. This is optional and its location can be varied depending upon the particular separation ligand, temperature, flow rates and the like.

Below the stripping section 16 is an outlet line 28 which leads to a low temperature stripper 38. Likewise, there is an upper outlet 34 above the enrichment section 18 which is directed to a recombiner 36.

Complex formed in the recombiner flows downwardly in the column and undergoes a chemical exchange reaction with the Silicon compound penetrating upwardly. As a result of this reaction the complex is enriched with Si-28 and depleted with Si-29 and Si-30, while gas will have just the opposite shift in isotopic abundance. Complex collected through outlet 28 is directed to the low temperature stripper 38 and then reboiler 46, where the primary separation of the ligand and silicon compound takes place. A high level of complex dissociation and stripping of silicon compound from the complexing agent is achieved in the high temperature stripper 62 and reboiler 66. Silicon compound from reboilers 66 and 46, after passing corresponding strippers enter column through inlet 52.

The outlet 74 from the high temperature reboiler 66 directs ligand to a purification apparatus 76. Although this may vary widely depending upon the particular ligand chosen as well as operating conditions, the purification apparatus shown includes a purification still 78 connected to a reboiler 80 and to a condensing unit 84. A pump 86 in outlet line 82 forces ligand from condensing unit 84 through a chiller 88 and in turn through ligand feedline 92 to the recombiner 36. In the recombiner 36 the ligand is combined with isotopically depleted silicon gas and directed back downwardly through line 96 into the enrichment section of the column 12.

In operation, for example with silicon tetrafluoride utilizing methanol as a ligand, the silicon tetrafluoride is introduced through line 14 into column 12. This will pass upwardly through stripping section 18 and outlet 34 into recombiner 36. Here it mixes with clean, purified methanol pumped through line 92. The methanol should contain less than 100 ppm of Silicon tetrafluoride to prevent short-circuiting of the isotope separation process. In the recombiner $SiF_4$-Methanol complex is formed and cooled below 0° C. The complex is introduced into the column and flows downward. At normal conditions the molar ratio of silicon tetrafluoride/methanol complex would be 1 to 4.

When equilibrium in the column is established, a fraction of the Si-28 enriched silicon tetrafluoride, approximately 1% or less of the material passing in the line 52, will be collected through outlet 24. On the other end of the column about the same amount of Si-28 depleted $SiF_4$ is collected through the outlet 22. Additional $SiF_4$ is introduced through line 14 to compensate for the collected $SiF_4$.

The height of the column 12 will vary depending upon which silicon compound and complexing agent are used, the reflux ratio and other reaction conditions. For the silicon tetrafluoride/methanol system with a reflux ratio of about 150–200, a column of 120 feet is sufficient to obtain 99.9% enriched Si-28 product.

Further the separation coefficient, alpha, will vary widely depending on the temperature and type of the solvent. Accordingly, as is well known to those skilled in the art, the overall conditions of the separation column can be varied to optimize the separation efficiency.

The separation coefficient can be determined by bubbling the silicon or germanium compound, for example silicon tetrafluoride, into a cooled jacketed reactor through the ligand, either solid or liquid, until it is saturated. After the complex/silicon tetrafluoride reaches equilibrium, a gas sample is taken. The amount of silicon tetrafluoride in the liquid or solid complex is much greater than in the gas phase. Therefore, one can assume the silicon isotope distribution in the complex is close to natural and is shifted alpha times in the gas phase. Thus, the measurement of isotopic ratio of the gas sample provides direct data on the enrichment coefficient alpha for each complexing agent. This was evaluated using silicon tetrafluoride with respect to the preferred ligands for use in the present invention with the following results.

METHANOL

Natural Samples

|       | #1     | #2     | #3     | #4     |
|-------|--------|--------|--------|--------|
| Si-28 | 92.256 | 92.250 | 92.251 | 92.251 |
| Si-29 | 4.650  | 4.652  | 4.651  | 4.651  |
| Si-30 | 3.094  | 3.099  | 3.098  | 3.098  |

Average

| Average | |
|---|---|
| Si-28 | 92.252 |
| Si-29 | 4.651 |
| Si-30 | 3.097 |

Enriched Samples

| Si-28 | 92.094 | 92.079 | 92.116 |
|-------|--------|--------|--------|
| Si-29 | 4.745  | 4.751  | 4.735  |
| Si-30 | 3.161  | 3.169  | 3.149  |

Average

| Average | |
|---|---|
| Si-28 | 92.096 |
| Si-29 | 4.744 |
| Si-30 | 3.160 |

Separation Coefficient $\alpha^{28} = 1.022 =/- 0.003$: (0.9786) reverse isotopic effect
$\alpha^{29} = 1.021 =/- 0.002$:
$\alpha^{30} = 1.021 =/- 0.004$.

ETHANOL

Enriched Samples

| Si-28 | 92.171 |
|-------|--------|
| Si-29 | 4.687  |
| Si-30 | 3.143  |

Separation Coefficient $\alpha^{28} = 1.0116 =/- 0.0005$: (0.9885) reverse isotopic effect
$\alpha^{29} = 1.0081 =/- 0.0002$:
$\alpha^{30} = 1.015 =/- 0.001$.

ISOPROPANOL

Enriched Samples

|  | #1 | #2 | Average |
|---|---|---|---|
| Si-28 | 92.229 | 92.146 | 92.188 |
| Si-29 | 4.663 | 4.712 | 4.688 |
| Si-30 | 3.108 | 3.142 | 3.125 |

Separation Coefficient

| $\alpha^{28}$ = 1.009 +/− 0.006: | (0.9911) | reverse isotopic effect |
|---|---|---|
| $\alpha^{29}$ = 1.008 +/− 0.005: | | |
| $\alpha^{30}$ = 1.009 +/− 0.004 | | |

ACTIVATED CARBON BEADS (ACB)

Enriched Samples

| Si-28 | 92.232 | 92.237 | 92.221 |
|---|---|---|---|
| Si-29 | 4.679 | 4.680 | 4.693 |
| Si-30 | 3.089 | 3.083 | 3.141 |

Average

| Si-28 | 92.230 |
|---|---|
| Si-29 | 4.684 |
| Si-30 | 3.104 |

Separation Coefficient

| $\alpha^{28}$ = 1.003 =/− 0.001: | (0.9969) | reverse isotopic effect |
|---|---|---|
| $\alpha^{29}$ = 1.007 =/− 0.003: | | |
| $\alpha^{30}$ = 1.002 =/− 0.014. | | |

This data indicates the separation technique of the present invention using the silicon halide in combination with the selected ligands effectively separates the respective isotopes. As it is known for some other isotope separation processes, $SiF_4$ shows so-called reverse isotopic effect, i.e., the heavier isotope is collected from the top of the column whereas the lighter isotope concentrates in the lower portion of the column.

This data further indicates the present separation technique will effectively separate isotopes of either silicon or germanium and is more efficient than separation techniques such as distillation or laser separation.

This has been a description of the present invention along with the preferred method of practicing the invention. However, the invention itself should only be defined by the appended claims wherein we claim:

1. A method of isotopically enriching a compound having the following general formula:

$$AH_nX_{4-n}$$

wherein A represent Si or Ge n is an integer from 0 to 4

X represents a halide ion comprising subjecting said compound to a chemical exchange reaction with a donor compound to form an isotopically enriched complex and recovering said enriched complex.

2. The method claimed in claim 1 wherein said donor compound is selected from the group consisting of methanol, ethanol, proponal and activated carbon.

3. The method claimed in claim 1 wherein A represents silicon.

4. The method claimed in claim 3 wherein X represents fluoride.

5. The method claimed in claim 4 wherein said compound is $SiF_4$.

6. The method claimed in claim 1 wherein A represents germanium.

7. The method claimed in claim 6 wherein X represents a fluoride and $_n$ represents 0.

8. The method claimed in claim 7 wherein said compound is $GeF_4$.

9. The method claimed in claim 1 where said compound is $GeF_4$.

10. The method claimed in claim 1 wherein said donor compound is selected from group consisting of $C_1$–$C_4$ alkyl alcohols, polyethylene glycols, ethers, molecular sieves, silica gel and activated carbon.

* * * * *